Nov. 11, 1952 D. D. AUSTIN, SR 2,617,331
GEAR FINISHING

Filed Sept. 3, 1946 3 Sheets-Sheet 1

INVENTOR.
DONALD D. AUSTIN Sr.
BY Whittemore, Hulbert
& Belknap ATTORNEYS

Nov. 11, 1952 D. D. AUSTIN, SR 2,617,331
GEAR FINISHING

Filed Sept. 3, 1946 3 Sheets-Sheet 2

INVENTOR.
DONALD D. AUSTIN Sr,
BY
Whittemore, Hulbert
& Belknap ATTORNEYS

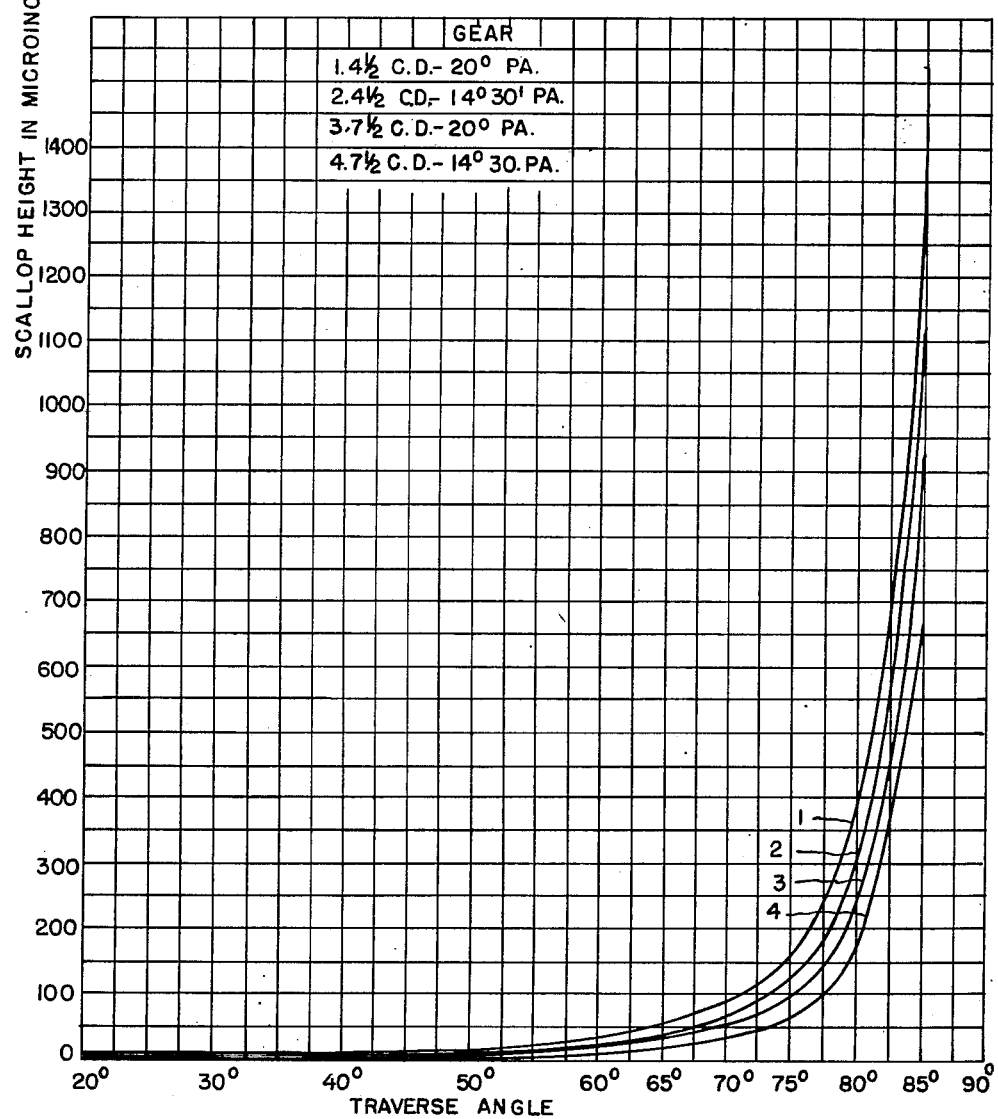

Patented Nov. 11, 1952

2,617,331

UNITED STATES PATENT OFFICE 2,617,331

GEAR FINISHING

Donald D. Austin, Sr., Detroit, Mich., assignor to National Broach & Machine Company, Detroit, Mich., a corporation of Michigan Application September 3, 1946, Serial No. 694,477

4 Claims. (Cl. 90—1.6)

The present invention relates to the finishing of gear teeth by a method which has come to be known generically in the art as crossed axes shaving.

In this type of gear finishing a gear to be finished is rotated in mesh with a gear-like shaving cutter, which cutter is in the form of a gear conjugate to the desired finished gear and is adapted to rotate therewith at crossed axes.

The term crossed axes refers to the relationship of the axes of the gear and cutter when the same are in mesh. Thus, for example, if a spur gear is meshed with a 15° helical gear, both gears being of the type in which teeth are formed on cylinders, the axes of the gears are non-intersecting and are crossed in space at the difference in helix angles, which in the present case is 15°.

The crossed axes relationship gives rise to a line frequently referred to as the center of crossed axes, and this term will be understood to refer to the common perpendicular to the two axes. It will be appreciated that two lines crossed in space have only a single common perpendicular and this common perpendicular is the shortest line joining the two axes and therefore may be taken to represent the shortest center distance between the meshing gears.

Conventional gear shaving as previously practiced involved the use of a cutter provided with cutting edges occupying the surfaces of the cutter teeth and formed therein by providing grooves extending generally up and down the faces of the cutter teeth and occupying planes perpendicular to the axis of the cutter. It is desirable that the grooves provided in the faces of the cutter teeth be in circumferential alignment so that a single series of grooves occupies a single plane perpendicular to the axis of the tool. It will be understood that the grooves of all of the teeth are spaced apart a uniform distance and will therefore provide a circumferentially aligned series of upstanding ribs. These ribs are so shaped that their top corners will occupy the surfaces of the cutter teeth and form cutting edges therein. Further consideration will show that each circumferential series of ribs therefore provides two axially spaced circumferentially aligned series of cutting edges which upon rotation of the cutter establish two parallel spaced apart cutting planes each of which is perpendicular to the cutter axis.

The provision of circumferentially aligned cutting edges on the cutter teeth results in a desirable uniformity of cutting action. Successive cuts on each gear tooth are initiated each time with a uniform and predetermined relationship to the preceding cut. Thus, on a single gear tooth, successive cuts made by any one of a single circumferentially aligned series of cutting edges will be spaced axially along the tooth from the preceding cut made by the same series of cutting edges by an amount representing the relative feed through the cutting plane established by the series of cutting edges during a single rotation of the gear. Thus, it is immaterial which tooth of the cutter engages the tooth of the gear, since all teeth of the cutter have cutting edges occupying fixed planes, which are preferably perpendicular to its axis. This circumstance results in uniform cutting action, and avoids the possibility that on a successive cut, the land surface between two adjacent grooves will crush down on the gear tooth surface and fail to remove a chip, as would occur if grooves in successive teeth of the cutter were not in circumferential alignment.

In the past, conventional gear finishing practice involved the initial meshing of a gear to be finished with a gear-like cutter of such helix angle that the axes of the gear and cutter were crossed at a predetermined angle between 3° and 30° and with a predetermined initial center distance between the gear and cutter, this center distance being established by the length of the common perpendicular to the axes of the gear and cutter. Thereafter the gear and cutter were rotated in mesh, one of the parts being driven by the other while a relative feed was introduced in the direction of the axis of the gear. This feed was continued until the gear had moved from a position in which the center of crossed axes lay at one side thereof to a position in which the center of crossed axes lay at the other side thereof, or in other words, the gear was caused to move completely across the center of crossed axes. In this type of gear finishing the severest cutting action was always performed at a fixed zone on the cutter teeth, and the depth of cut permitted in a single pass was limited. Hence it was usually necessary to provide one or more in-feed steps to machine the gear teeth to final dimension. As a result of this, it will be appreciated that all passes made before the final in-feed step tended to produce off-lead conditions. This is a serious defect, since the cutter tends to follow the lead existing on the gear teeth, and the operation involved machining a false lead on the gear teeth, and after in-feed to final depth, attempting to correct this false lead.

It has further been suggested (application of

Walter S. Praeg, Serial No. 648,366, filed February 18, 1946, and now Patent No. 2,557,462, granted June 19, 1951), that the relative traverse between the gear and cutter at constant center distance could be, in the case of shoulder gears, in a direction perpendicular to the axis of the cutter. This direction of traverse was resorted to due to the inherent difficulty of shaving shoulder gears, and while it is practical as an expedient in this situation it is not in all respects a completely satisfactory operation.

Other attempts have been made to adopt relative traverse in other directions such as, for example, perpendicular to the axis of the gear, but this introduces inherent difficulties calling for an undesirable and in many respects impractical modification of the cutter. Specifically, it is found that when a standard cutter of the type referred to above is employed and the relative traverse at constant center distance is in a direction perpendicular to the axis of the gear, it is practically impossible to provide a desirable finish on the surface of the teeth, for the reason that cutting planes established by rotation of the cutter are spaced apart relative to the direction of traverse to such an extent that marks visible to the eye and which can be measured by sensitive indicators are left on the surfaces of the teeth.

It has been found, however, that certain advantages follow the adoption of a relative traverse at constant center distance between a gear and cutter in a direction oblique to the axes of both gear and cutter, provided that this direction of relative traverse is selected in accordance with certain principles which have been found to be controlling. Before proceeding to a detailed explanation of the controlling principles, the advantages inherent in what is termed herein diagonal traverse will be mentioned.

In the first place, when the direction of relative traverse is oblique to the axes of both gear and tool, it will be appreciated that the center of crossed axes as defined above shifts simultaneously along the axes of both the gear and cutter. Inasmuch as the center of crossed axes represents the shortest center distance it is at or immediately adjacent this point that the finishing of the teeth of the gear to final dimension is accomplished. Since the diagonal traverse referred to results in a shifting of the center of crossed axes along the axis of the cutter as well as along the axis of the gear, it will be appreciated that this tends to prolong tool life for the reason that the final finishing operation is not confined to a narrow band around the cutter.

An important result of the fact that the center of crossed axes shifts along the teeth of the cutter during traverse is that a substantially heavier cut may be taken when diagonal traverse is employed than would be possible where axial traverse is used. This is for the reason that a portion of the cutter can take a heavier cut briefly than it could if cutting action remained localized at that portion throughout the complete traverse. Thus as the heaviest cutting action progresses along the cutter, so that a given portion of the cutter is under heavy cutting load only momentarily, the total depth of cut may be substantially increased over that possible employing axial traverse.

This in turn leads to another very desirable result. When diagonal traverse is used, the axes of gear and tool may be at the final desired spacing before initiating traverse, so that final gear dimension may be produced with one or two passes, and the necessity for incremental infeed between strokes is avoided. Therefore, all finish cutting is done at the theoretically correct lead, and the steps of initially forming a false lead and then attempting to correct it, as described above in conjunction with axial traverse, is avoided.

Another advantage inherent in the use of diagonal traverse where the helix angle of the cutter is properly selected with reference to the helix angle of the gear is that a relatively wide gear may be finished with a relatively narrow cutter. Inasmuch as cutters of this type are difficult to machine and are expensive to produce this is a very important consideration.

The use of diagonal traverse also permits modifications to be introduced to the teeth of the gear in a new manner. By a proper selection of the direction of traverse with reference to the crossed axes setting, it is possible to finish the teeth of the gear from end to end by any predetermined portion measured longitudinally of the teeth of the cutter. Accordingly, where it is desired to produce crowned gear teeth, that is, teeth which are bowed longitudinally so as to have increased chordal thickness centrally, this modification may be introduced by initially forming the teeth of the cutter with what may be referred to as a reverse modification, namely, teeth which are longitudinally concave or of decreased chordal thickness at their mid portions. If the variation of chordal thickness between the mid portions and the ends of the cutter teeth is .005 inch, it will be appreciated that a like reverse modification will be imparted to the teeth of the gear provided that relative traverse is selected such that the ends of the cutter teeth operate at closest center distance on the ends of the gear teeth and the middle portions of the cutter teeth operate the closest center distance upon the middle portions of the gear teeth. On the other hand, if the direction of traverse is selected so that intermediate portions between the ends and middle portions of the cutter teeth operate upon the ends of the gear teeth at closest center distance while the mid portions of the cutter teeth operate at closest center distance upon the middle portions of the gear teeth, the teeth of the gear will still be crowned but the difference in chordal thickness between their ends and their middle portions will be less than .005 inch by an amount depending upon the chordal thickness of the portions of the cutter teeth which operate at closest center distance upon the ends of the gear teeth. Accordingly, a cutter provided with a predetermined reverse crown may be employed to crown the teeth of a work gear by different amounts depending upon the selection of the direction of traverse.

It is possible to employ the same principles in imparting other modifications to the teeth of a gear. In fact, it is possible to impart substantially any desired modification thereto, the only practical limitation on this being that the modification must not be so severe that interference or excessive cutting taking place away from the center of crossed axes will cut portions of the gear teeth to a size which would provide clearance when such portions pass the center of crossed axes. By way of further example, a cutter may be provided with tapered teeth, that is, teeth having a chordal thickness which increases from end to end. This modification of the cutter teeth may also appear as lead variations on opposite sides of the teeth. The cutter so modified may be employed to finish a gear which will have a corresponding but opposite modification in its teeth and again the amount of the modification may be controlled by the initial setting and selection of the traverse angle so that predetermined portions of the cutter teeth considered longitudinally thereof come into play against the work teeth at the center of crossed axes, or closest center distance.

As a further interesting example of the flexibility of the method disclosed herein, it will be appreciated that with a cutter having teeth reversely crowned it is possible to obtain non-uniformly tapered teeth on a work gear by initially setting the gear and tool so that only one end portion of the cutter teeth comes into action against the entire face width of the gear teeth.

Another important advantage inherent in diagonal traverse is that it is possible to obtain cutting action simultaneously across the entire face width of the gear. This condition will exist when the amount of material to be removed is considerable so that cutting takes place at the ends of the gear teeth at furthest center distance before the opposite ends of the teeth at closest center distance have reached the shifting center of crossed axes. This feature is of particular importance since it is when considerable stock is to be removed that it is most desirable to effect rapid stock removal. It will be appreciated that this type of cutting is not possible when a relative traverse in a direction parallel to the axis of the work gear is employed, except in limited cases, since the gear is being fed into the tool so that cutting action is initiated at one end of the teeth.

Another important feature of diagonal traverse is that it permits movement of the gear into backlash with a relatively short movement following completion of the cutting stroke while at the same time the teeth of the gear and cutter remain in loose mesh. It will be appreciated that this is entirely different from the situation resulting from axial feed of the gear where at small crossed axes the teeth of the gear and cutter tend to come out of mesh substantially at the instant cutting traverse is complete.

Another important feature of diagonal traverse is the relatively short traverse which may be obtained. In prior axial traverse, if the face width of the gear is 6" it will be apparent that a stroke of somewhat more than 6" is required to cause the center of crossed axes to cross the gear from face to face. However, by a proper selection of direction of traverse this stroke may be reduced to a smaller one.

With the foregoing general remarks in mind, it is an object of the present invention to provide a new method of gear cutting characterized by a direction of relative traverse between a gear and cutter operated in mesh at crossed axes and at constant center distance which is oblique to both the axes of the gear and tool.

It is a further object of the present invention to provide a new method of modifying teeth of a gear which comprises running it in mesh at constant center distance with a modified cutter, and providing a relative traverse between the gear and cutter in a direction which is oblique to the axes of both gear and tool and further which is in a direction selected such that a predetermined portion of the width of the cutter will come into action against the entire width of the gear.

It is a further object of the present invention to provide a new method of cutting gears which provides for a shorter feeding stroke than previously possible with axial traverse, which provides for more rapid cutting by virtue of the fact that the entire face width of the gear may be cut simultaneously and a deeper cut is permissible, and which renders possible the employment of cutters having relatively narrow action for widths for finishing relatively wide gears while retaining the other advantages of diagonal traverse.

Other objects and features of the invention will become apparent as the description proceeds, especially when taken in conjunction with the accompanying drawings, wherein:

Figure 5 is a plot of curves representing variations in scallop depth in accordance with traverse angle; and Figure 6 is a diagrammatic view showing the additive effect of scallop formations and surface roughness to produce gross surface finish deviation.

Figure 1:
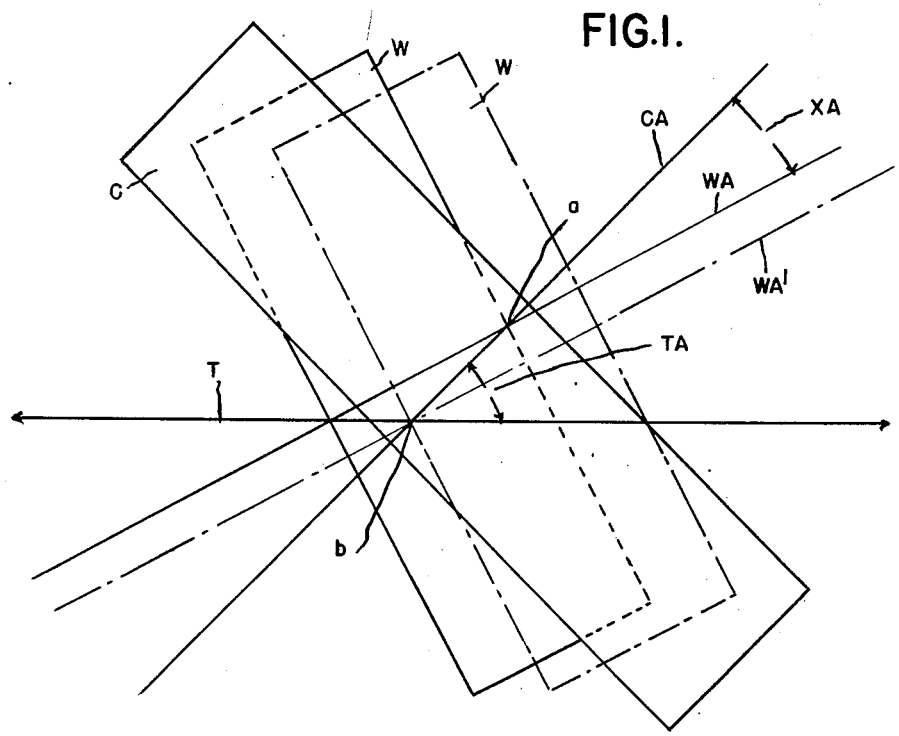
Figure 1 is a diagrammatic view illustrating the method of diagonal traverse gear shaving, showing the gear in two limiting positions at the start of cutting to final dimension and at the end thereof.

Referring first to Figure 1, there is illustrated a cutter to which the reference character C has been applied. There is likewise shown a work gear to which the reference character W has been applied. In this figure the gear and cutter are indicated as in mesh at limited crossed axes, this angle XA between the axes WA and CA being in this instance 15°. In diagonal traverse shaving, it is found that the angle of crossed axes should be between 3° and 20°. The direction of relative traverse between the cutter and the work gear is indicated by the letter T. In this figure the work gear is in full lines in its initial position and dot and dash lines in the final position indicated at W', the direction of relative traverse being that which would result from traverse of the work gear to the right. It will be observed that in the full line position of the work gear the center of crossed axes is at a point designated $a$ and that in the position of the work gear illustrated in dot and dash lines the center of crossed axes has shifted to a point designated $b$. It will further be observed that during this relative traverse the center of crossed axes has moved along the axis CA of the cutter from the point $a$ to the point $b$ and that as the work gear has been traversed it has intersected the center of crossed axes from one end thereof to the other so that when the axis of the gear is in the position WA', the teeth of the gear have been finished from end to end.

It will be observed that the center of crossed axes traverses not more than 90 percent of the face width of the cutter leaving as a minimum about 5 percent at each end thereof not traversed by the center of crossed axes. This is desirable to maintain firm guiding support throughout the full stroke.

It will be apparent from Figure 1 that one end of the gear teeth is finished by portions adjacent a corresponding end of the cutter teeth, that the middle portions of the gear teeth are finished by the middle portions of the cutter teeth, and that the other ends of the gear teeth are finished by portions adjacent the other ends of the cutter teeth. It will accordingly be apparent that any modification applied to the cutter teeth longitudinally thereof will be reproduced in an opposite sense longitudinally of the gear teeth, as will be more fully explained hereinafter.

So far no mention has been made of the helix angles of the gear and cutter, and this is for the reason that the helix angles are not critical except that the helix angle of the gear and cutter must differ by an amount equal to the crossed axes setting and the crossed axes setting must be within the limits set. An inspection of Figure 1 indicates that the width of cutter necessary to finish the gear at the angular setting indicated is considerably less than the width of the gear. It is also apparent that the length of stroke necessary to finish the gear is relatively short. As a general rule it will be observed that where the cutter axis makes a larger angle with the direction of a traverse than does the gear axis, the width of the cutter may be less than the width of the gear.

The angle between the direction of traverse and the cutter axis is designated as the traverse angle. This angle appears directly in Figure 1 as the angle TA. This angle will be used to define the direction of traverse, since it has been found that this angle TA controls certain irregularities in the gear tooth surfaces which are inherent in this type of gear shaving.

Figure 2:
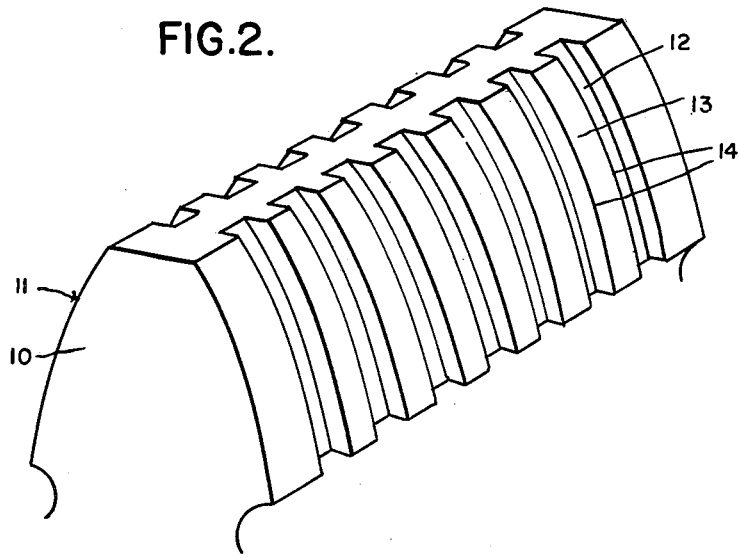
Figure 2 is a perspective view of a cutter tooth.

In Figure 2 there is illustarted a tooth 10 of the type employed on the cutter C referred to. The tooth 10 has a profile indicated at 11 which is of the desired form and which normally will be an involute with or without minor modifications. The working surfaces of the tooth are interrupted by a plurality of grooves 12 which, as illustrated, are of substantially rectangular cross section but which may be tapered as disclosed in Praeg Patent 2,278,737 issued April 7, 1942, and which extend up and down the working surface of the tooth in a direction such that the grooves 12 occupy planes of rotation when the cutter C is rotated. The provision of the grooves 12 leave intermediate ribs 13 therebetween. The top surfaces of the ribs are land surfaces which occupy the working surface of the tooth and have at their opposite edges sharp cutting corners designated 14. It will be understood that each tooth of a cutter C is identical in all respects and that therefore the corresponding cutting edges 14 provided on all of the teeth occupy a single plane of rotation. In other words, the corresponding ribs 13 formed on all of the teeth are in strict circumferential alignment.

It is highly desirable that the above construction of cutter be employed, since the cutting action obtained thereby is uniform and consistent. It will be understood that if the grooves 12 where not arranged in strict circumferential alignment, it would be practically impossible to predict the precise action of the cutter relative to a gear, since it would be impossible to predict the location of a cutting edge with respect to the preceding cut on a particular tooth as it crossed the center of crossed axes.

From the standpoint of freedom of cutting, chip disposal, strength of the tool and other considerations it is known that the grooves in a cutter of this type should not be less than about .030 inch in width. Generally speaking, grooves are spaced apart so as to leave ribs of roughly corresponding width.

As will have become apparent from the foregoing description, a certain nonuniformity of cutting action is inherent in the employment of diagonal traverse gear shaving which imposes a limitation thereon.

Reverting for a moment to axial traverse for purposes of comparison, it will be recalled that in that method, the cutting action did not shift longitudinally of the cutter teeth and hence the finish imparted to the gear teeth was theoretically uniform from end to end. Thus if it happened that a circumferential series of cutting edges on the cutter occupied a plane intersecting the center of crossed axes, this same series of cutting edges always remained at the center of crossed axes, and finished the surfaces of the gear teeth uniformly to theoretically correct dimension. If it happened that the center of crossed axes fell between adjacent cutting edges, the teeth of the gear were finished to a dimension depending upon the normal spacing between the gear and tool axes and the distance of the nearest cutting plane from the center of crossed axes, but at all events the cutting action was uniform on the gear teeth.

With diagonal traverse, the situation is quite different. Here deliberately the center of crossed axes is caused to shift along the cutter, so that it passes successively through a series of the cutting planes established by the several series of circumferentially aligned cutting edges. Thus during traverse the center of crossed axes intersects a cutting plane at one instant, and thereafter it passes across a land surface, a plane of trailing cutting edges, a groove, and finally a second plane of cutting edges. This gives rise to a slight irregularity in the finished surfaces, which at low angles of traverse are imperceptible but which at higher angles renders the surface wavy and irregular.

It will be appreciated that the irregular surface thus produced has regularly alternating high and low portions giving rise to what is termed herein scallops. It will be apparent that the theoretical depth of scallops, or distance between tops and bottoms of scallops measured perpendicular to the tooth surface, may be computed from geometrical considerations. It will further be evident that these scallops increase from zero to a maximum as the traverse angle TA increases from zero to 90°.

In Figure 5, I have plotted curves showing the effect of change in traverse angle on depth of scallop. Depth of scallop is measured in microinches, and traverse angle is plotted from 0° to 90°.

There has been a steady improvement in the quality of finished gears in recent years, and the standard of acceptable gears has constantly risen. It has become accepted practice to define surface finish in terms of micro-inch deviations or roughness. Measurements of finish are not usually taken over an area sufficient to pick up a regular, spaced, recurring scallop such as are formed by the present method. However, sensitive measuring devices are available which will measure these surfaces along a path which will include several scallops. Micro-inch measurements of finish are ordinarily employed to determine surface roughness caused by scratches and tearing in the surface and it is of course apparent that this roughness will be present in the present method of gear shaving substantially to the same extent as in conventional prior gear shaving practice. This surface roughness will be additive, so far as final finish is concerned, to the scallops resulting from diagonal traverse in gear shaving.

Referring now to Figure 6, I have indicated at 80 a line representing a theoretically smooth surface. Wavy line 81 represents deviation from this surface traceable to the scallops formed by the present method. It will be observed that lines 82 define an envelope measuring plus and minus deviations due to this effect. Superimposed on wavy line 81 is the jagged line 83 which represents the roughness in the tooth surface due to scratches, cutter marks, and the like. Lines 84 define an envelope determining maximum plus and minus deviations from the theoretical smooth surface due to the combined effects of scallops and surface roughness, or what I term herein the gross deviations from a smooth surface. It will be appreciated that this gross deviation is independent of form error, such as off-lead conditions, and may be considered merely as surface finish.

At the present time, success has been attained in producing surface finish on gears on the order of 40 to 60 micro-inches. Properly applied, crossed axes gear shaving can produce a surface finish which indicates at about 25 micro-inches. It is at once apparent that to maintain gross surface finish, as defined above, within the close limits attainable to modern methods, that portion of gross surface finish deviation due to scallops produced by diagonal traverse surface shaving must be kept very small.

Accordingly, in order that gears shaved by the diagonal traverse method shall be within the high standards attainable by modern gear finishing practice, it is found that the traverse direction should make an angle with the work gear axis not exceeding a predetermined maximum. The upper limit of traverse direction permissible varies somewhat with certain factors, but it has been found that for the great majority of automotive gears, that is, those whose pitch diameter does not exceed 8 inches (operating with standard cutters at center distances not exceeding 8½ inches) and where the shaving cutter has a series of circumferentially aligned grooves whose width is not less than .030 inch, the traverse direction should make an angle with the axis of the cutter which does not exceed 65°. This is considered to be the upper limit for superior quality gears.

As a lower limit, it is recognized that traverse parallel to the tool axis is ineffective to distribute finishing action across the gear and traverse within 5° of this direction is not considered desirable. Further, with traverse in a direction too close to parallel to the work axis, the desirable advantages of diagonal traverse, while present, are not sufficiently accentuated. Accordingly, a second lower limitation is imposed that traverse should be in a direction making an angle of more than 5° with both the gear and tool axes.

The precise angle selected for a given operation will depend upon circumstances and a few of the influencing factors will be mentioned. Other things being equal, the traverse angle will be as large as possible within the permitted range to obtain a short stroke. With wider grooves on the cutter, it becomes necessary to reduce the angle, and grooves should not be less than .030 inch in width. To obtain the advantage of using a narrow face width cutter for a wider gear, the gear axis must make a smaller angle with the direction of traverse than does the cutter axis. The smaller the diameter of the gear (for a given cutter) the smaller must be the traverse angle. The final selection of traverse direction may depend in part upon calculation, but in the last analysis will depend largely upon trial of the selected angle, and variation in accordance with observed results.

It has been found that in order to produce satisfactory teeth, it is necessary to select the traverse direction with respect to the space between adjacent cutting planes on the cutter so that a theoretical error due to scallops not to exceed a definite maximum will be obtained.

In addition to the cutting action referred to above, it is found that there is a slight burnishing action which is effected by the lands at the tops of the ribs 13. Accordingly, the surfaces of the teeth thus burnished will be at least somewhat modified toward the desired profile.

Figure 3:
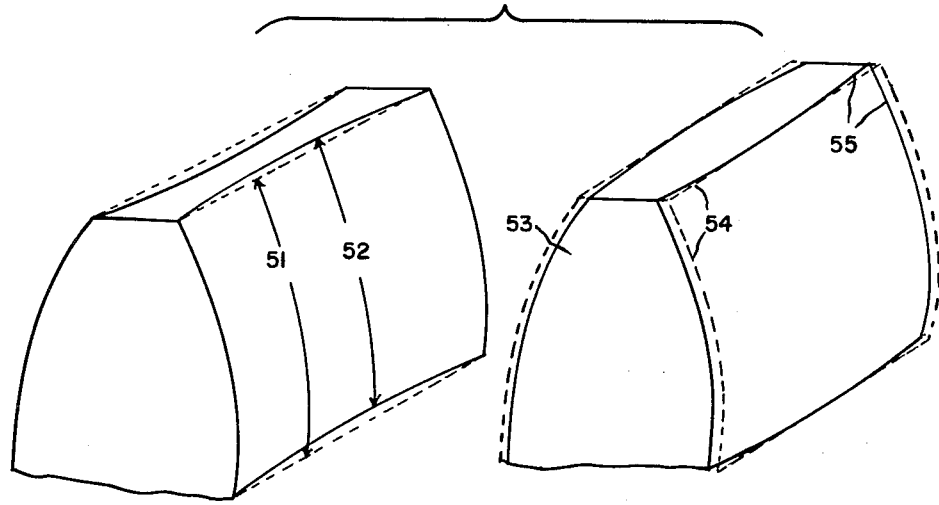
Figure 3 is a diagrammatic view illustrating a modified cutter tooth and the modified gear tooth resulting from its use.

Referring now to Figure 3, I have illustrated a cutter tooth which is modified by being of decreased tooth thickness at its center portion. In this figure the outline of an unmodified cutter tooth is indicated in broken lines at 51 and the modified profile is indicated in full lines at 52. At 53 is indicated a work gear tooth produced by the cutter tooth and in this case I have indicated in dotted lines 54 the profile of an unmodified tooth and in full lines 55 the modified profile. It will be observed that the tooth 53 has a reverse modification imparted to it by the cutter tooth. Where the cutter tooth is of reduced chordal thickness at its central portion the gear tooth 53 is of reduced chordal thickness at its ends. This type of tooth modification is carried out by the practice of the present method of diagonal traverse since this method inherently results in a single portion of a cutter tooth operating on a single corresponding portion of a gear tooth. Thus for example in Figure 3 one end of the gear tooth 53 will be machined by one end of the cutter tooth, the middle portion of the gear tooth 53 will be machined by the middle portion of the cutter tooth and the other end of the gear tooth 53 will be machined by the other end of the cutter tooth. By a proper selection of initial position and traverse direction it will be appreciated that the gear tooth 53 may be machined from end to end by engagement of a predetermined portion only of the cutter tooth at the center of crossed axes, and that therefore the modification imparted to the gear tooth 53 may be less than the other modification initially provided in the cutter tooth.

Figure 4:
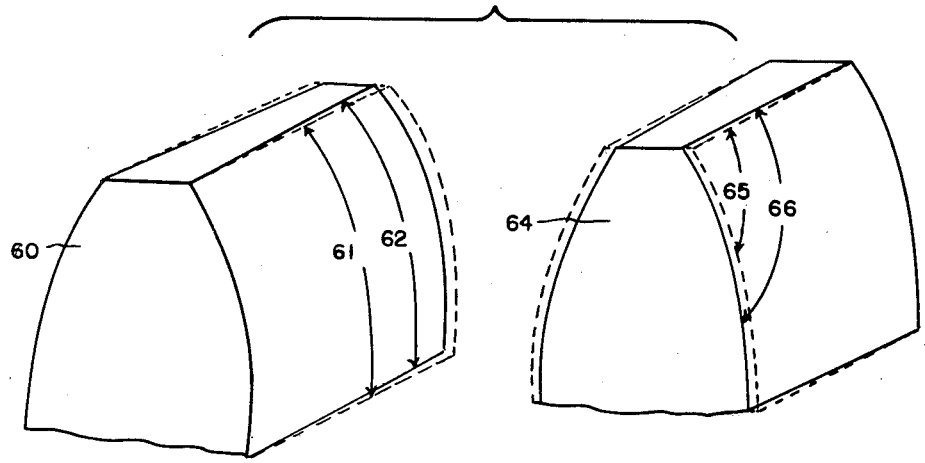
Figure 4 is a diagrammatic view illustrating somewhat differently modified cutter tooth and the modified gear tooth resulting from its use.

Referring to Figure 4, there is illustrated possibility of another type of modification. A cutter tooth 60 is indicated and in dotted lines 61 there is indicated the profile of an unmodified tooth, whereas the full lines 62 indicate modification imparted to the cutter tooth 60. In this case it will be observed that the cutter tooth 60 is of continuously varying chordal thickness throughout its length, being substantially thicker at one end than at the other. A gear tooth machined thereby is indicated at 64 and in dotted lines 65 there is indicated the outline of the gear tooth prior to or without modification, while the full lines 66 indicate the modified contour. In this case it is assumed that the right hand end of the gear tooth 64 which is of greater chordal thickness was machined by the right hand end of the cutter tooth 60 which is of reduced chordal thickness; that the central portion of the gear tooth 64 which is of intermediate chordal thickness was machined by the intermediate portion of the cutter tooth 60 which is also of intermediate chordal thickness; and that the left hand end of the gear tooth 64 which is of reduced chordal thickness was machined by the left hand end of the cutter tooth 60 which is of the greatest chordal thickness. As previously mentioned, the amount of modification, that is, the variation in chordal thickness, will be the same on the gear tooth as it is on that portion of the cutter tooth which was employed in machining the gear tooth at the center of crossed axes. Thus for example, if by a proper selection of initial position and traverse direction, the entire width of the gear tooth 64 was machined by a portion of the cutter tooth amounting to only half of its length, the variation in chordal thickness between the ends of the gear teeth will be approximately half the variation in chordal thickness between the ends of the cutter teeth.

It is believed unnecessary to illustrate further modifications but it will be understood that the present method lends itself to imparting substantially any desired modification to the teeth of a gear by employing a generally opposite modification initially to the cutter teeth. Thus for example an off-center crowning operation is feasible in which the high point of the crown is located substantially nearer one end of the teeth.

It will further be understood that a given cutter may be employed to impart various modifications such for example as varying and differing amounts of crown to gear teeth by the selection of traverse angle.

While there is illustrated and described a particular method of shaving gear teeth at crossed axes by a method of diagonal traverse, and while the method has been illustrated by a number of specific examples, it will be appreciated that this full and complete disclosure is made solely to enable those skilled in the art to practice the invention, the scope of which is indicated by the appended claims.

What I claim as my invention is:

1. The method of imparting a desired longitudinally varying modification to the teeth of a gear which comprises providing the teeth of a gear-like tool with an opposite modification extending over a predetermined portion of their length, meshing said gear and tool with their axes crossed at an angle between 3° and 20°, and relatively traversing said gear and tool at constant center distance in a direction oblique to the axes of both gear and tool, the direction of relative translation and the initial setting being such that the said predetermined portion of the teeth of said tool is progressively active from end to end of said gear teeth, and the direction of relative translation further making an angle with the cutter axis not exceeding 65°.

2. The method of imparting a longitudinally varying modification to gear teeth which comprises providing a gear-like shaving cutter conjugate to said gear at crossed axes and having an opposite modification formed in its teeth, meshing said gear and cutter with their axes crossed at an angle between 3° and 20°, and relatively traversing said gear and cutter at constant center distance in a direction oblique to both the axes of the gear and cutter and making an angle with the axis of the cutter not exceeding 65°.

3. The method of imparting a longitudinally varying modification to gear teeth which comprises providing a gear-like shaving cutter conjugate to said gear at crossed axes and having an opposite modification formed in its teeth, meshing said gear and cutter with their axes crossed at an angle between 3° and 20°, and relatively traversing said gear and cutter at constant center distance in a direction oblique to both the axes of the gear and cutter and making an angle with the axis of the cutter not exceeding 65° and selecting the angle of traverse so as to obtain a predetermined distribution of the modification longitudinally of the gear teeth.

4. The method of shaving a series of like gears which comprises initially meshing a gear member to be finished with a gear-like shaving cutter member with their axes crossed at an angle of between 3 degrees and 30 degrees, with the axes having a normal spacing corresponding to the desired final dimension of the gear member, and with the center of crossed axes being located outside the gear member and spaced from the adjacent side thereof by a distance small enough to preserve the meshing relation between said members and large enough to accommodate the excess material on an unshaved gear member to be removed by shaving, rotating one of said members directly and thereby driving the other member in rotation through their meshed relation, effecting a relative back and forth traverse stroke between said members in a plane parallel to the axes of both of said members in a direction oblique to the axes of both of said members and making an angle of between 5 degrees and 65 degrees with respect to the axis of the cutter, the length of such stroke being sufficient to cause the center of crossed axes to shift completely across said gear member and return, maintaining the spacing between the axes of said members constant throughout the finishing operation, terminating rotation and relative traverse between said members in the position of initial meshing, replacing the finished gear member with an unfinished gear member and repeating the finishing operation.

DONALD D. AUSTIN, Sr.

REFERENCES CITED

The following references are of record in the file of this patent:

UNITED STATES PATENTS

| Number | Name | Date |
|---|---|---|
| 2,126,178 | Drummond | Aug. 9, 1938 |
| 2,157,981 | Drummond | May 9, 1939 |
| 2,274,491 | Mentley | Feb. 24, 1942 |

FOREIGN PATENTS

| Number | Country | Date |
|---|---|---|
| 480,247 | Great Britain | Feb. 14, 1938 |